(12) United States Patent
Andersen

(10) Patent No.: US 10,305,070 B2
(45) Date of Patent: May 28, 2019

(54) TEXTURED LEAD-ACID BATTERY HOUSING

(71) Applicant: Johnson Controls Technology Company, Plymouth, MI (US)

(72) Inventor: Glenn W. Andersen, Hartford, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 312 days.

(21) Appl. No.: 15/166,099

(22) Filed: May 26, 2016

(65) Prior Publication Data

US 2017/0018743 A1 Jan. 19, 2017

Related U.S. Application Data

(60) Provisional application No. 62/192,299, filed on Jul. 14, 2015.

(51) Int. Cl.
| | |
|---|---|
| *H01M 2/02* | (2006.01) |
| *H01M 2/12* | (2006.01) |
| *H01M 10/06* | (2006.01) |
| *H01M 10/613* | (2014.01) |
| *H01M 10/625* | (2014.01) |

(Continued)

(52) U.S. Cl.
CPC ......... *H01M 2/024* (2013.01); *H01M 2/0237* (2013.01); *H01M 2/0262* (2013.01); *H01M 2/12* (2013.01); *H01M 2/1258* (2013.01); *H01M 10/06* (2013.01); *H01M 10/12* (2013.01); *H01M 10/613* (2015.04); *H01M 10/625* (2015.04); *H01M 10/6567* (2015.04); *H01M 2/0247* (2013.01); *H01M 10/049* (2013.01); *H01M 10/0413* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 4,604,564 A | * | 8/1986 | Windisch | H01M 10/128 320/107 |
| 4,696,874 A | * | 9/1987 | Tadiello | H01M 10/484 141/199 |

(Continued)

FOREIGN PATENT DOCUMENTS

| | | |
|---|---|---|
| CN | 2938424 Y | 8/2007 |
| EP | 0391443 A3 | 2/1992 |

(Continued)

OTHER PUBLICATIONS

Masaki Yamaguchi, Shinya Sasaki, Shojiro Suzuki & Yuki Nakayama (2014) Injection-molded plastic plate with hydrophobic surface by nanoperiodic structure applied in uniaxial direction, Journal of Adhesion Science and Technology, 29:1, 24-35, DOI: 10.1080/01694243.2014.973158 (Year: 2014).*

(Continued)

*Primary Examiner* — Alix E Eggerding
(74) *Attorney, Agent, or Firm* — Fletcher Yoder, P.C.

(57) ABSTRACT

In one embodiment, a lead-acid battery includes a hydrophobic texture of an outer surface of a housing, where the hydrophobic texture is configured to resist formation of a residue on the outer surface of the housing when the lead-acid battery is undergoing a formation process in a water bath.

25 Claims, 7 Drawing Sheets

(51) Int. Cl.
*H01M 10/6567* (2014.01)
*H01M 10/12* (2006.01)
*H01M 10/04* (2006.01)

(56) References Cited

U.S. PATENT DOCUMENTS

| | | |
|---|---|---|
| 7,128,997 B2 | 10/2006 | Harding et al. |
| 7,399,392 B2 | 7/2008 | Woods et al. |
| 7,648,792 B2 | 1/2010 | Kaschmitter et al. |
| 8,124,268 B2 | 2/2012 | Hock et al. |
| 9,269,996 B2 | 2/2016 | Friesen et al. |
| 2003/0182972 A1 | 10/2003 | Reher et al. |
| 2005/0189912 A1 | 9/2005 | Jeon |
| 2006/0207084 A1 | 9/2006 | Phillips et al. |
| 2007/0160910 A1* | 7/2007 | Sugie ............... H01M 4/16 429/245 |
| 2010/0323228 A1 | 12/2010 | Okamoto et al. |
| 2014/0363712 A1* | 12/2014 | Wohrle ............... H01M 2/024 429/94 |
| 2015/0037695 A1 | 2/2015 | Ward et al. |
| 2015/0132622 A1 | 5/2015 | Gohl et al. |

FOREIGN PATENT DOCUMENTS

| | | |
|---|---|---|
| GB | 2498741 B | 4/2015 |
| JP | 2000251921 A | 9/2000 |
| WO | 2006119310 A3 | 6/2008 |
| WO | 2011100602 A1 | 8/2011 |

OTHER PUBLICATIONS

NANOMYTE SuperCN Plus, Functionally Graded Superhydrophobic Coating, NEI Corporation, Accessed Mar. 8, 2016, p. 1, http://neicorporation.com/specs/NANOMYTE_SuperCNPlus_ProductSheet.pdf.

Talbot David, Super-Repellent Plastic, MIT Technology Review, Feb. 23, 2006, pp. 1-5, https://www.technologyreview.com/s/405378/super-repellent-plastic/.

PCT/US2016/041676 International Search Report and Written Opinion dated Oct. 18, 2016.

\* cited by examiner

TEXTURED LEAD-ACID BATTERY HOUSING

CROSS REFERENCE TO RELATED APPLICATIONS

This application claims priority from and the benefit of U.S. Provisional Application Ser. No. 62/192,299, entitled "SELF-CLEANING BATTERY CASE; SELF-CLEANING IN-PROCESS VENTS," filed Jul. 14, 2015, which is hereby incorporated by reference.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

In some cases, a lead-acid battery may be disposed in a water bath during a formation process to dissipate heat generated within a housing of the battery. However, substances other than water (e.g., contaminants) may be present in the water bath as a result of exhaust expelled from the battery and/or contaminants present in an environment where the formation process occurs. The additional substances may adhere to and form a residue on an outside surface of the housing (e.g., bathtub rings). The residue may be difficult and time consuming to clean and may detract from an aesthetic quality of the battery, which may ultimately affect an attractiveness of the battery to a consumer. Accordingly, it is now recognized that products and procedures for addressing issues with formation of the residue on the outside surface of the housing are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a lead-acid battery includes a hydrophobic texture of an outer surface of a housing, where the hydrophobic texture is configured to resist formation of a residue on the outer surface of the housing when the lead-acid battery is undergoing a formation process in a water bath.

In another embodiment, a lead-acid battery formation system includes a plurality of lead-acid batteries configured to undergo an exothermic reaction that generates heat during a formation process, where each lead-acid battery of the plurality of lead-acid batteries comprises a housing with a hydrophobic texture, and a water bath that includes water configured to surround at least a portion of each lead-acid battery of the plurality of lead-acid batteries during the formation process, where the water is positioned to absorb the heat generated from the plurality of lead-acid batteries, and where the hydrophobic texture is configured to resist formation of a residue on an outer surface of the housing of each lead-acid battery of the plurality of lead-acid batteries in the water bath.

In another embodiment, a method includes assembling components of a lead-acid battery in a housing of the lead-acid battery, sealing the housing, where the housing comprises a hydrophobic texture, disposing electrolyte material into the housing to initiate an exothermic reaction in the housing, disposing the lead-acid battery in a water bath configured to dissipate heat generated in the housing, and resisting formation of a residue on an outer surface of the housing with the hydrophobic texture.

DRAWINGS

Various aspects of this disclosure may be better understood upon reading the following detailed description and upon reference to the drawings in which.

Figure 4:
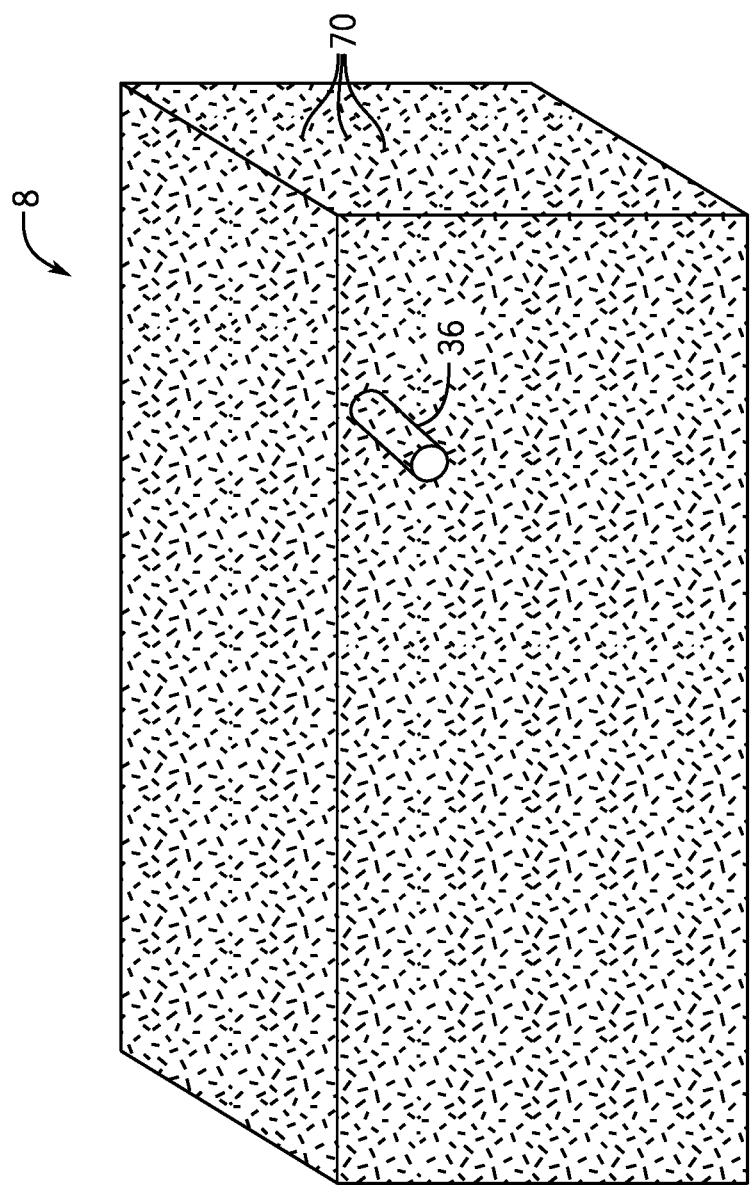
FIG. 4 is a perspective view of an embodiment of a battery of the plurality of batteries of FIG. 2 that includes an exaggerated hydrophobic texture configured to resist formation of a residue on a housing of the battery, in accordance with an aspect of the present disclosure.
Figure 5:
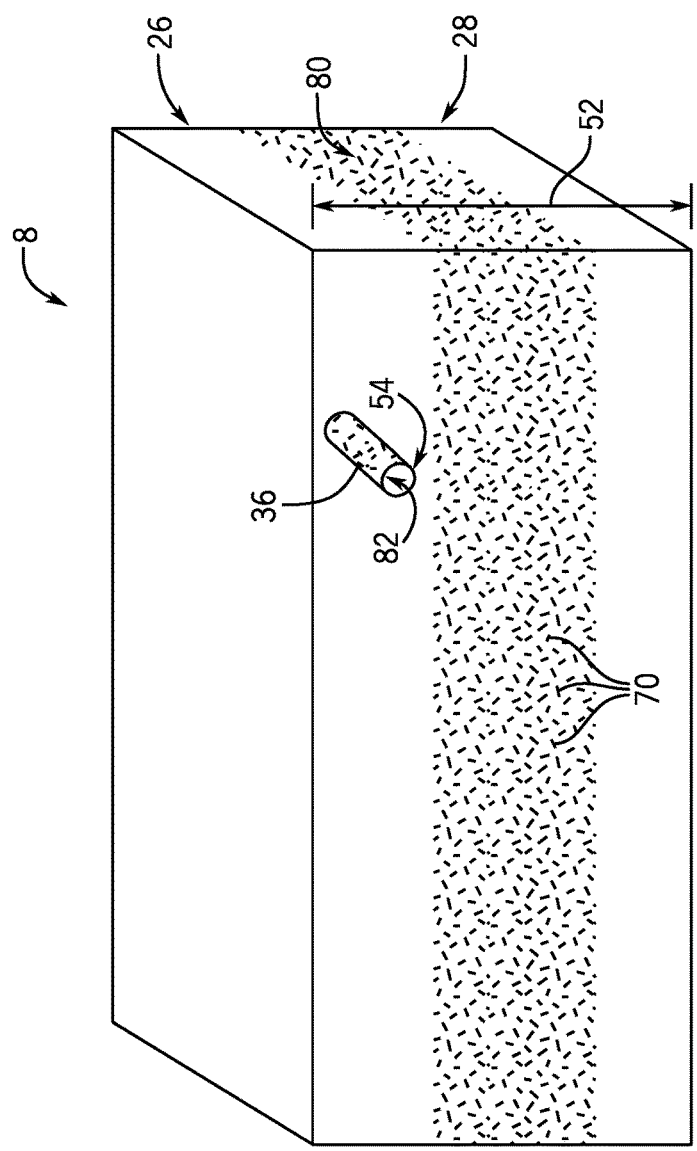
FIG. 5 is a perspective view of an embodiment of a battery of the plurality of batteries of FIG. 2 that includes an exaggerated hydrophobic texture formed as a band around a housing of the battery, in accordance with an aspect of the present disclosure.
Figure 6:
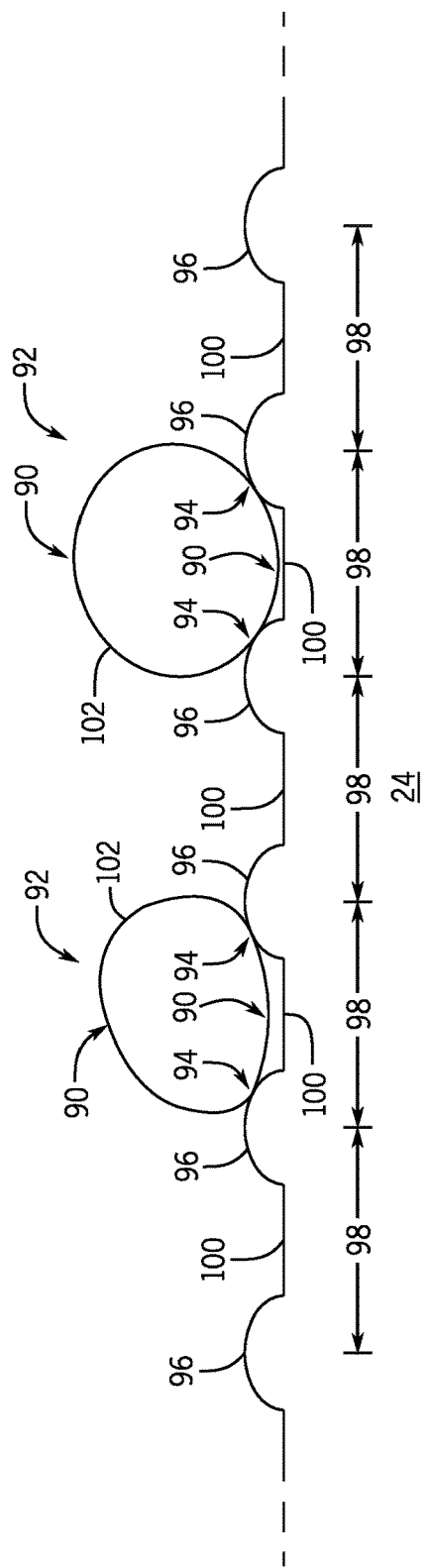
Figure 7:
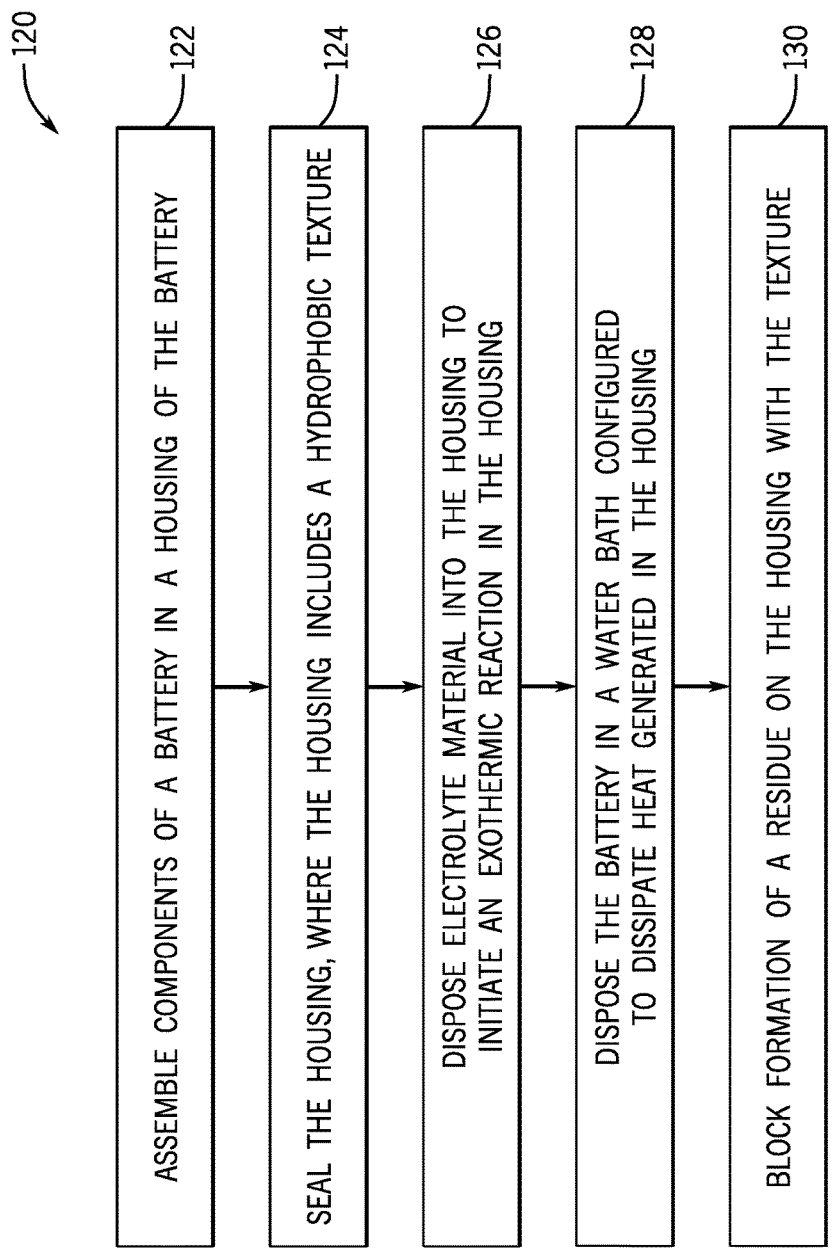

FIG. 6 is an expanded sectional view of an embodiment of the housing of the battery of FIGS. 4 and 5 that includes the hydrophobic texture contacting water particles, in accordance with an aspect of the present disclosure; and FIG. 7 is a flow diagram of an embodiment of a process that may be used to generate a battery that includes a housing with a hydrophobic texture and that resists build up of residue on the housing after a formation process, in accordance with an aspect of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Batteries (e.g., lead-acid batteries) may store power (e.g., electrical energy) that is ultimately supplied to a load (e.g., a vehicle or a component of a vehicle). Lead-acid batteries may include one or more plates (e.g., positive and negative plates) that are configured to react with an electrolyte material (e.g., an acid) to generate power. However, simply placing the electrolyte material into a housing of the lead-acid battery may not be sufficient to generate the electrical energy demanded by the load. Accordingly, the lead-acid battery may undergo a formation process that supplies electrical charge to the plates and initiates a reaction within the housing.

During the formation process, a temperature within the housing may increase as a result of the reaction generating heat in the housing of the lead-acid battery (e.g., an exothermic reaction). In some cases, the increase in temperature and/or the reaction itself may cause the electrolyte material to evaporate (e.g., bubble) within the housing. To reduce an amount that the temperature increases during the formation process, the lead-acid battery may be disposed in a water bath. Accordingly, water may surround the housing of the lead-acid battery and absorb heat, thereby reducing and/or maintaining a temperature within the housing. However, the water bath may not reduce the temperature enough to block all of the electrolyte material from evaporating. Therefore, in some cases, electrolyte material may inadvertently escape from the housing of the lead-acid battery through a vent, for example.

Electrolyte material that escapes from the housing of the lead-acid battery may collect in the water bath. Additionally, other contaminants from within the battery (e.g., paste and/or pasting paper for coating the plates) and/or in an environment surrounding the lead-acid battery may be present in the water bath. Accordingly, the electrolyte and/or other contaminants that collect in the water bath may adhere to the housing and form a residue (e.g., film) around the housing of the lead-acid battery. The residue (e.g., film) may be difficult and/or time consuming to remove from the housing. Further, cleaning the housing may not completely remove the residue. The residue (e.g., film) on the housing of the lead-acid battery may be undesirable to consumers of the lead-acid battery. Therefore, sales of the lead-acid battery may decrease because the lead-acid battery with the residue is less attractive to consumers than a clean lead-acid battery without the residue. Therefore, it is now recognized that a lead-acid battery that resists formation of the residue (e.g., film) is desired.

Embodiments of the present disclosure relate to a lead-acid battery housing that includes a hydrophobic, textured surface (e.g., a texture formed from nanostructures that is water resistant). Therefore, despite the presence of the electrolyte and/or other contaminants in the water bath during the formation process, formation of the residue (e.g., film) on the housing of the lead-acid battery may be resisted because the hydrophobic, textured surface may reduce contact between water in the water bath (and thus the contaminants) and the housing. However, the water may still absorb heat generated within the housing, thereby cooling the lead-acid battery during formation. Accordingly, the water baths may be utilized to cool the battery during formation, but the hydrophobic texture may resist formation of the residue (e.g., film) on an outer surface of the housing.

Additionally or alternatively, the hydrophobic texture may clean the residue (e.g., film) from the outer surface of the housing should the residue form when the lead acid battery is in the water bath. For example, rinsing (e.g., with water) the outer surface of the housing that includes the hydrophobic texture may cause water particles to bead and fall off of the surface of the housing (e.g., via gravity) because the water particles do not adhere to the hydrophobic texture. Accordingly, in some cases, water particles applied to the housing (e.g., via a rinsing process) may collect (e.g., absorb) electrolyte and/or contaminants that adhered to the outer surface of the housing during the formation process and remove at least a portion of any residue that formed. Therefore, the hydrophobic texture may facilitate cleaning of the outer surface of the housing in addition to, or in lieu of, resisting formation of the residue during the formation process.

Figure 1:
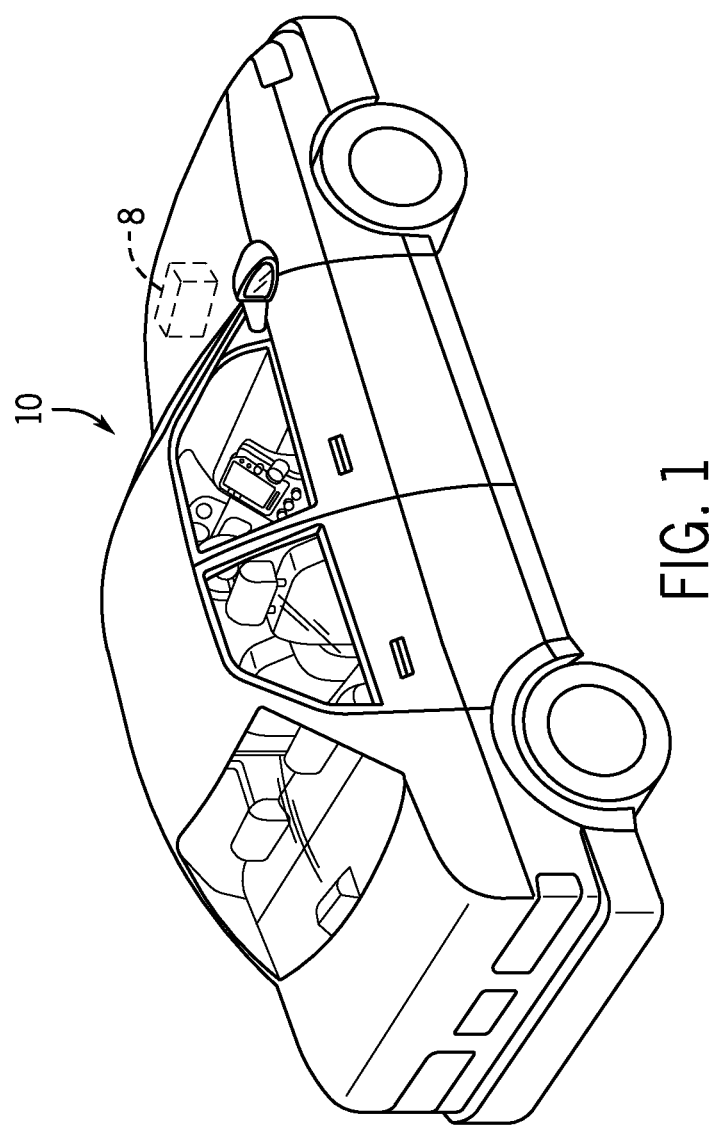
FIG. 1 is a perspective view of a vehicle having a battery that provides power for various components of the vehicle, in accordance with an aspect of the present disclosure.

To help illustrate the manner in which the present embodiments may be used in a system, FIG. 1 is a perspective view of an embodiment of a battery 8 that includes a housing with a hydrophobic texture being utilized with a vehicle 10. As shown in the illustrated embodiment of FIG. 1, the vehicle includes the battery 8. The battery 8 may be placed under the hood of the vehicle 10 (e.g., as illustrated), in a trunk of the vehicle 10, under a seat of the vehicle 10, or otherwise positioned in the vehicle 10. In certain embodiments, the battery 8 may be a lead-acid battery.

In some embodiments, the battery 8 may supply power to components of the vehicle's 10 electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. While the embodiment of FIG. 1 illustrates the battery 8 supplying power to the vehicle 10, it should be noted that other embodiments of the battery 8 may be employed in stationary power systems or other suitable applications.

Figure 2:
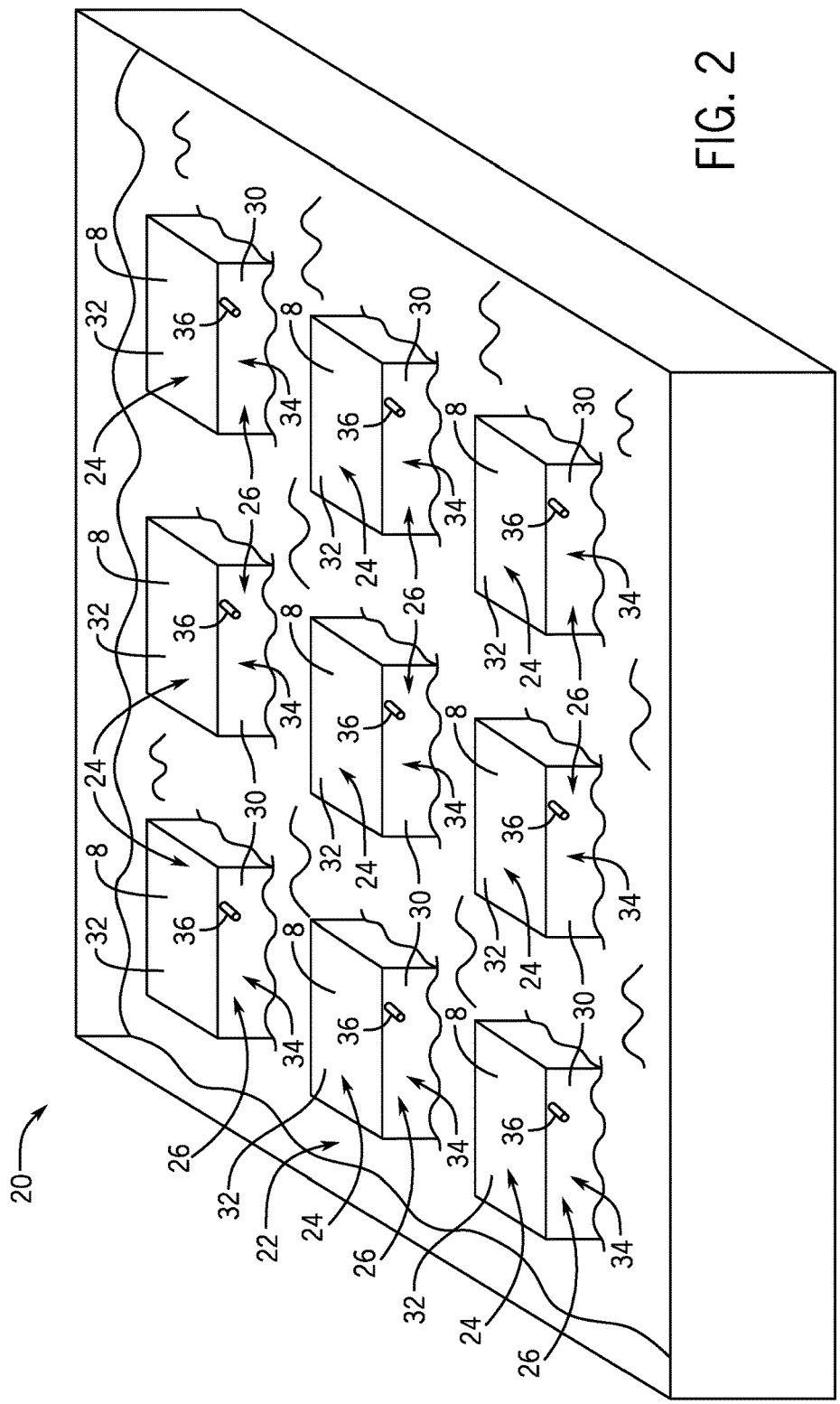
FIG. 2 is a perspective view of an embodiment of a water bath configured to dissipate heat from a plurality of batteries having a hydrophobic texture during a formation process, in accordance with an aspect of the present disclosure.

As discussed above, the battery 8 may include a housing with a hydrophobic texture that may resist formation of a residue (e.g., film) on the battery 8 during a formation process. For example, FIG. 2 is a perspective view of batteries 8 disposed in a water bath 20 that includes water 22. As discussed above, the water 22 may be used to absorb heat that may be produced within the batteries 8 during the formation process. For example, an exothermic reaction (e.g., heat generating) may occur within a housing 24 of the batteries 8 during the formation process, which may release heat in the housing 24. Accordingly, at least a portion of the heat generated in the housing 24 may be transferred to the water 22 to maintain a temperature of the battery 8 within a predetermined temperature range (e.g., a temperature range suitable for the formation process).

As shown in the illustrated embodiment of FIG. 2, the batteries 8 may be disposed in the water 22 and a first portion 26 of the housing 24 of each battery 8 may extend above the water 22. The exothermic reaction taking place within the housing 24 may primarily occur in a second portion 28 (see FIG. 3) of the housing 24 that is disposed (e.g., submerged) in the water 22. However, in other embodiments, the entire housing 24 of each of the batteries 8 may be fully submerged in the water 22 (e.g., all surfaces of the housing 24 contact the water 22). Accordingly, the housing 24 of each battery 8 may include a substantially fluid-tight seal, such that water 22 may be blocked from entering into the housing 24 of the batteries 8. For example, the housing 24 of each battery 8 may include a polymeric material (e.g., polypropylene, polyethylene, or another suitable polymer) that may be molded into a predetermined shape configured to hold components (e.g., the positive plates, the negative plates, separators, and/or electrolyte material) of the battery 8. In some cases, the housing 24 of each battery 8 may include two or more pieces that are coupled to one another (e.g., via a laser weld) to form the substantially fluid-tight seal. For example, a receptacle portion 30 of the housing 24 may be configured to receive the components (e.g., the positive plates, the negative plates, separators, and/or electrolyte material) of the battery 8. Additionally, a lid portion 32 of the housing 24 may be configured to be disposed over an opening of the receptacle portion 30 and sealed (e.g., via a laser weld) to block the water 22 from entering into the housing 24.

As discussed above, it may be desirable for the housing 24 to include hydrophobic properties to resist formation of a residue (e.g., film) the housing 24. In accordance with embodiments of the present disclosure, a hydrophobic texture may be applied to, or incorporated in, an outer surface 34 and/or a vent 36 of the housing 24, which may enable the housing 24 to resist formation of the residue (e.g., film). As used herein, the hydrophobic texture included on the outer surface 34 and/or the vent 36 of the housing 24 may include one or more nanostructures (e.g., nano-sized and/or micro-sized structural features) such as contours, protrusions, grooves, recesses, and/or other suitable features spaced throughout the outer surface 34 and/or the vent 36 of the housing 24.

In certain embodiments, the hydrophobic texture may be included in an injection mold configured to form the housing 24 of each of the batteries 8. For example, the injection mold may be machined to include the hydrophobic texture, which may then be incorporated in the housing 24 upon formation of the housing 24 (e.g., when the mold solidifies). In other embodiments, the hydrophobic texture may be generated after the housing 24 is formed in the injection mold. For example, a laser or another mechanical tool may be utilized to form the hydrophobic texture in the outer surface 34 and/or the vent 36 of the housing 24. In still further embodiments, the hydrophobic texture may be coated (e.g., painted) on the outer surface 34 and/or the vent 36 of the housing 24. For example, coating (e.g., paint) may include nanoparticles surrounded by a fluid (e.g., an adhesive). When the fluid (e.g., adhesive) is applied to the outer surface 34 and/or the vent 36 of the housing 24, the nanoparticles may adhere to the housing 24, such that the hydrophobic texture is formed.

Including the hydrophobic texture on the housing 24 may enable the housing 24 to resist formation of the residue (e.g., film) during the formation process. For example, the texture on the housing 24 may be hydrophobic such that the water 22 is directed away from the housing 24. In some cases, contact between the housing 24 and the water 22 may be reduced because the water 22 forms substantially spherical beads on the hydrophobic texture of the housing 24. The shape of the water 22 (e.g., substantially spherical beads) may resist contact between portions of particles of the water 22 and the housing 24 that would otherwise contact the housing 24 when the hydrophobic texture is not included. The hydrophobic texture of the housing 24 is discussed in more detail herein with reference to FIGS. 4 and 5.

Figure 3:
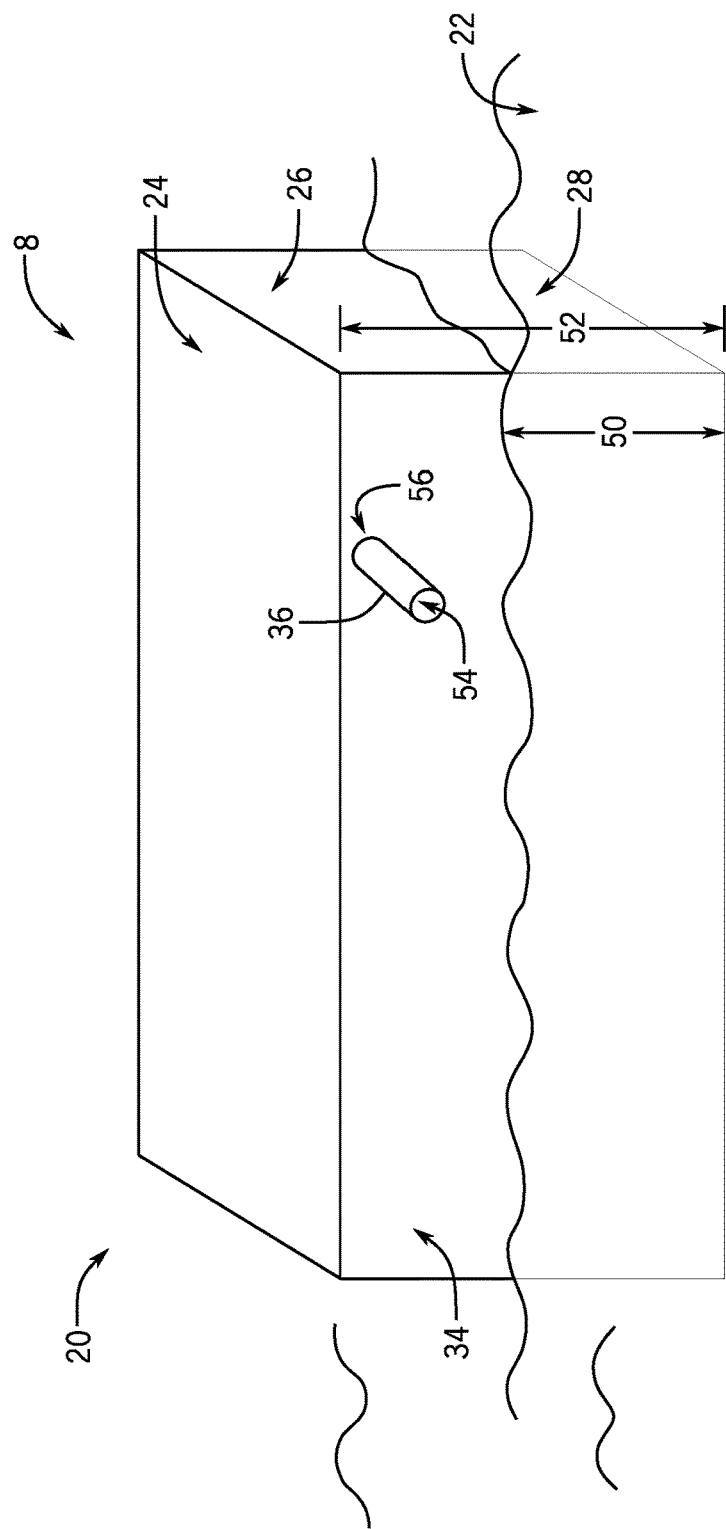
FIG. 3 is a perspective view of an embodiment of a battery of the plurality of batteries of FIG. 2 disposed in the water bath, in accordance with an aspect of the present disclosure.

Traditionally, when positioned in the water bath 20, a residue (e.g., film) may form on the housing 24 of one or more of the batteries 8. For example, FIG. 3 is an expanded perspective view of the battery 8 disposed in the water 22 of the water bath 20. As shown in the illustrated embodiment of FIG. 3, the water 22 may cover the second portion 28 of the housing 24 and extend a distance 50 along a height 52 of the battery 8. In some embodiments, the distance 50 may be between 10% and 90%, between 25% and 75%, or between 50% and 70% of the height 52 of the battery 8. In other embodiments, the distance 50 may extend to approximately (e.g., plus or minus 5%) two-thirds of the height 52 of the battery.

In traditional batteries, a residue (e.g., film) may form at the distance 50 where the water 22 no longer contacts the battery 8 (e.g., at the point between the first portion 26 and the second portion 28 of the housing). As discussed above, the water 22 may include electrolyte emitted from the battery 8 as a result of an increase in temperature within the housing 24. Further, the electrolyte may include other contaminants collected from within the housing 24 of the battery 8. As a non-limiting example, paste and/or pasting paper used to coat conductive plates (e.g., positive conductive plates and/or negative conductive plates) disposed in the housing 24 may collect in the electrolyte and escape from the housing 24. Upon exiting the housing 24, the electrolyte, and thus any contaminants within the electrolyte, may ultimately collect in the water 22. As the water 22 laps against the housing 24, water particles may adhere to the outer surface 34 of the housing 24. In some cases, such water particles may evaporate and leave behind contaminants on the outer surface 34 of the housing 24, thereby forming the residue (e.g., film). The residue may be unappealing to consumers of the batteries 8, and thus, reduce sales of the batteries 8.

Accordingly, the hydrophobic texture may be applied to the outer surface 34 and/or the vent 36 of the battery 8, such that formation of the residue on the housing 24 may be resisted. In some embodiments, the hydrophobic texture may be applied to the housing 24 when the housing 24 is formed in an injection mold (e.g., the hydrophobic texture is included in the injection mold template and formed on the housing 24 as the housing 24 is formed). In other embodiments, the hydrophobic texture may be applied after the housing 24 is formed (e.g., solidified) using a laser or other mechanical device configured to form nanostructures on the housing 24. In still further embodiments, the hydrophobic texture may be coated (e.g., painted) on the outer surface 34 and/or the vent 36 of the housing 24.

Including the hydrophobic texture in the vent 36, may resist adherence of the electrolyte that condenses in the vent 36 from adhering to a surface of the vent 36, and ultimately blocking an opening 54 of the vent 36. Accordingly, including the hydrophobic texture in the vent 36 may avoid a pressure increase within the housing 24 caused by accumulation of electrolyte that blocks the opening 54. It should be noted that while the illustrated embodiment of FIG. 3 includes the vent 36 at a position 56 on the housing 24, the vent 36 may be located at any suitable position that enables exhaust gases (e.g., oxygen and/or hydrogen) to escape from the housing 24.

FIG. 4 is a perspective view of the battery 8 that includes a hydrophobic texture 70 (e.g., nanostructures) on the outer surface 34 of the housing 24. It should be noted that the hydrophobic texture 70 of FIG. 4 is exaggerated for the purposes of discussion. Indeed, in some embodiments, the hydrophobic texture 70 may not be noticeable when compared to a battery that does not include the hydrophobic texture 70 (e.g., the hydrophobic texture 70 is a series of nano-sized structures that may not be detectable by the naked eye). Additionally, in certain embodiments, the hydrophobic texture 70 may be included in the vent 36 of the housing 24.

In other embodiments, the hydrophobic texture 70 may not be included on the entire housing 24. For example, FIG. 5 is a perspective view of the battery 8 that includes the hydrophobic texture forming a band 80 around the housing 24, but not covering the entire housing 24. The band 80 may be positioned along the height 52 of the battery 8, such that the band 80 is included in both the first portion 26 and the second portion 28 of the battery 8. Accordingly, the band 80 may contact the water 22 along a perimeter of the battery 8 between the first portion 26 and the second portion 28. When the water 22 laps, the band 80 of the hydrophobic texture 70 may limit contact between the water particles and the housing 24 (e.g., adherence of the water particles to the housing 24), such that formation of the residue (e.g., film) is substantially limited. Including the hydrophobic texture 70 as the band 80 around the housing 24 may reduce manufacturing costs by reducing an amount of the outer surface 34 of the housing 24 in which the hydrophobic texture 70 is incorporated. However, as shown in the illustrated embodiment of FIG. 5, the hydrophobic texture 70 may also be included in the vent 36, such that adherence of the electrolyte to an interior surface 82 of the vent 36 is resisted and outward flow of exhaust gases (e.g., oxygen and/or hydrogen) is encouraged (e.g., the opening 54 of the vent 36 is not blocked by accumulation of electrolyte and/or contaminants).

The hydrophobic texture 70 may facilitate beading of the water 22, thereby resisting contact between a first portion 90 of water particles 92 and the housing 24, as shown in FIG. 6. Such beading typically occurs where the water 22 laps against the housing 24 (e.g., near the water lines) or where liquid may be sprayed (e.g., in and around the vent 36). In some embodiments, a second portion 94 of the water particles 92 does contact the housing 24. However, the second portion 94 may be less than a portion of the water particles 92 that would otherwise contact the housing 24 without the hydrophobic texture 70. Below the water line, pressure caused by the water 22 may be sufficient to cause full contact between the water particles 92 and the housing 24. However, the residue (e.g., film) may not form because the water particles 92 may not evaporate from the outer surface 34, thereby depositing contaminants on the outer surface 34 of the housing.

As shown in the illustrated embodiment of FIG. 6, nanostructures 96 (e.g., mounds, bumps, and/or other structural features) may be formed in the housing 24 and spaced a distance 98 between one another. The distance 98 may block the water particles 92 from contacting portions 100 in between the nanostructures 96 of the housing 24, thereby reducing an amount of contact between the water 22 and the housing 24. In certain embodiments, the distance 98 between the nanostructures 96 in combination with the shape of the nanostructures 96 may cause the water particles 92 to be substantially spherical. The substantially spherical shape of the water particles 92 may reduce an amount of a circumference 102 of the water particles 92 that contacts the housing 24. For example, the second portion 94 of the water particles 92 may be between 0.5% and 15%, between 1% and 10%, or between 3% and 5% of the circumference 102 of the water particles 92. Therefore, a relatively small amount of the water particles 92 contacts the housing 24, thereby resisting formation of the residue (e.g., film) on the housing 24. For example, reducing an amount of the water particles 92 that contact the housing 24 may reduce and/or eliminate the water 22 (and/or the contaminants in the water 22) that adheres to the housing 24. Resisting formation of the residue (e.g., film) may enhance an aesthetic quality of the battery 8 to consumers, thereby potentially leading to increased customer satisfaction.

Creating batteries 8 that include the hydrophobic texture 70 on the housing 24 may be performed using a process 120, as shown in FIG. 7. For example, FIG. 7 is a flow chart of an embodiment of the process 120 that may be utilized to generate a battery 8 with the hydrophobic texture 70 that resists formation of the residue (e.g., film) on the housing 24. At block 122, assembly of battery components in the housing 24 may be performed. For example, positive and negative conductive plates may be disposed in the housing 24 (e.g., the receptacle portion 30 of the housing 24). In some embodiments, the housing 24 includes receiving features that enable the positive and negative conductive plates to be secured into the housing 24 (e.g., slots, grooves, and/or other structural features that may secure the conductive plates into the housing 24). Additionally, in some embodiments, separators may be positioned between respective positive and negative conductive plates, such that a positive conductive plate may not directly contact a negative conductive plate. Utilizing separators within the battery 8 may avoid short circuits, which may enhance an operating life of the battery 8. In certain embodiments, the positive conductive plates, the negative conductive plates, and the separators may form elements of individual cells of the battery 8. The individual cells of the battery 8 may be coupled (e.g., welded) to one another in series or in parallel, such that the battery 8 may provide a predetermined amount of electrical energy to a load (e.g., via battery terminals).

At block 124, the housing 24 may be substantially sealed (e.g., the lid portion 32 may be laser welded to the receptacle portion 30). As discussed above, the housing 24 may include the hydrophobic texture 70, which may resist formation of the residue (e.g., film) on the outer surface 34 of the housing 24. Accordingly, at least the outer surface 34 and/or the vent 36 of the housing 24 may include the hydrophobic texture 70 that resists formation of the residue (e.g., film) by reducing adherence of the water 22 in the water bath 20 to the housing 24. In some embodiments, the hydrophobic texture 70 may be incorporated into the housing 24 at the time the housing 24 is formed (e.g., molded). For example, the injection mold that is configured to create the housing 24 may include etchings and/or protrusions that may generate the texture 70 on the outer surface 34 and/or the vent 36 of the housing 24 at the time the housing 24 is formed. In other embodiments, the hydrophobic texture 70 may be formed in the housing 24 after generation of the housing 24 (e.g., via a laser and/or another mechanical device configured to create the hydrophobic texture 70).

Once the hydrophobic texture 70 is formed and the housing 24 is sealed, the electrolyte (e.g., acid) may be disposed in the housing 24 to initiate an exothermic reaction in the housing 24 (e.g., the formation process), as shown at block 126. Additionally, at block 128, the battery 8 may be disposed in the water bath 20, such that heat generated in the housing 24 may be dissipated to the water 22 of the water bath 20. As the exothermic reaction occurs, electrolyte may inadvertently escape from the housing 24 through the vent 36 (e.g., via evaporation or acid overflow). The hydrophobic texture 70 on the vent 36 may facilitate movement of electrolyte in the vent 36 back toward the housing 24 (e.g., the receptacle portion 30) because the vent 36 may be angled toward the receptacle portion 30 relative to the outer surface 34 of the housing 24. Therefore, electrolyte is directed toward the receptacle portion 30 via gravitational forces and because adherence of the electrolyte to the surface of the vent 36 is resisted (e.g., via the textured surface 70). Thus, including the textured surface 70 in the vent 36 and angling the vent 36 toward the receptacle portion 30 reduces accumulation of electrolyte in the vent 36, which may avoid a pressure increase in the housing 24. As electrolyte is inadvertently exhausted from the housing 24, some of the electrolyte may collect in the water bath 20. As discussed above, the electrolyte may also include contaminants from within the housing 24. Additionally, contaminants from an operating environment surrounding the water bath 20 may collect in the water 22. The hydrophobic texture 70 may reduce an amount of contact between the water 22 and the housing 24 when compared to a housing that does not include the hydrophobic texture 70. Accordingly, formation of the residue (e.g., film) on the housing 24 may be substantially resisted by the hydrophobic texture 70, as shown at block 130.

One or more of the disclosed embodiments, alone or on combination, may provide one or more technical effects including resisting formation of the residue (e.g., film) on the outer surface 34 of the housing 24. Removing the residue (e.g., film) from the housing 24 may enhance an aesthetic appeal of the battery 8 to consumers, thereby increasing profits. Additionally, the hydrophobic texture 70 may be included in the vent 36 of the housing 24 to avoid accumulation of the electrolyte in the vent 36, which may ultimately increase pressure in the housing 24. Therefore, operation of the battery 8 may be improved by including the hydrophobic texture 70 in the vent 36 and avoiding undesirable pressure increases within the housing 24. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A lead-acid battery, comprising:
a hydrophobic texture forming a band around a first portion of an outer surface of a housing, wherein the hydrophobic texture is configured to resist formation of a residue on the first portion of the outer surface of the housing when the lead-acid battery is undergoing a formation process in a water bath, wherein the band around the first portion of the outer surface of the housing covers a surface area of a side of the housing that is less than a total surface area of the side of the housing, and wherein a second portion of the outer surface of the housing is without the hydrophobic texture.

2. The lead-acid battery of claim 1, wherein the hydrophobic texture comprises a plurality of nanostructures configured to limit contact between water and at least the first portion of the outer surface of the housing.

3. The lead-acid battery of claim 2, wherein the plurality of nanostructures is formed in the housing with an injection mold.

4. The lead-acid battery of claim 2, wherein the plurality of nanostructures is formed in the housing with a laser.

5. The lead-acid battery of claim 2, wherein the plurality of nanostructures comprises contours, protrusions, grooves, recesses, other suitable structural features, or a combination thereof.

6. The lead-acid battery of claim 1, wherein the housing comprises a vent to emit exhaust gases from the housing, and wherein electrolyte inadvertently escapes through the vent.

7. The lead-acid battery of claim 6, wherein the vent comprises the hydrophobic texture on an interior surface such that adherence of the electrolyte to the interior surface is resisted and outward flow of the exhaust gases is encouraged.

8. The lead-acid battery of claim 7, wherein the hydrophobic texture directs the electrolyte toward the housing such that the electrolyte does not block an opening of the vent.

9. The lead-acid battery of claim 1, wherein the hydrophobic texture is configured to facilitate beading of water particles of the water bath on the housing.

10. The lead-acid battery of claim 9, wherein beading of the water particles reduces contact between the water particles and the housing when compared to the second portion of the outer surface of the housing.

11. The lead-acid battery of claim 9, wherein 5% of a surface area of the water particles contacts the housing.

12. The lead-acid battery of claim 1, comprising:
a positive conductive plate disposed in the housing;
a negative conductive plate disposed in the housing;
a separator disposed between the positive conductive plate and the negative conductive plate in the housing; and
electrolyte surrounding the positive conductive plate and the negative conductive plate in the housing, wherein the electrolyte is configured to react with the positive conductive plate and the negative conductive plate such that the lead-acid battery is configured to supply electrical energy to a load.

13. The lead-acid battery of claim 12, comprising a plurality of positive conductive plates and a plurality of negative conductive plates, wherein the housing comprises a receptacle portion and a lid portion, wherein the receptacle portion is configured to receive the plurality of positive conductive plates and the plurality of negative conductive plates and the electrolyte, and wherein the lid portion is configured to be disposed over the receptacle portion.

14. The lead-acid battery of claim 13, wherein the receptacle portion and the lid portion are configured to be sealed to one another using a laser weld.

15. The lead-acid battery of claim 14, wherein a seal between the receptacle portion and the lid portion is fluid-tight.

16. A lead-acid battery formation system, comprising:
a plurality of lead-acid batteries configured to undergo an exothermic reaction that generates heat during a formation process, wherein each lead-acid battery of the plurality of lead-acid batteries comprises a housing with a hydrophobic texture forming a band around a first portion of an outer surface of the housing, wherein the band around the first portion of the outer surface of the housing covers a surface area of a side of the housing that is less than a total surface area of the side of the housing, and wherein a second portion of the outer surface of the housing is without the hydrophobic texture; and a water bath comprising water configured to surround at least a part of the first portion of the housing of each lead-acid battery of the plurality of lead-acid batteries during the formation process, wherein the water is positioned to absorb the heat generated from the plurality of lead-acid batteries, and wherein the hydrophobic texture is configured to resist formation of a residue on at least the first portion of the outer surface of the housing of each lead-acid battery of the plurality of lead-acid batteries in the water bath.

17. The lead-acid battery formation system of claim 16, wherein the water of the water bath comprises electrolyte from a lead-acid battery of the plurality of lead-acid batteries, first contaminants from the lead-acid battery of the plurality of lead-acid batteries, second contaminants from an environment surrounding the water bath, or a combination thereof.

18. The lead-acid battery formation system of claim 17, wherein the hydrophobic texture is configured to facilitate beading of water particles of the water, such that adherence of the electrolyte, the first contaminants, the second contaminants, or a combination thereof, to at least the first portion of the outer surface of the housing is resisted.

19. The lead-acid battery formation system of claim 16, wherein the water is configured to surround approximately two-thirds of the outer surface of the housing of each lead-acid battery of the plurality of lead-acid batteries.

20. The lead-acid battery formation system of claim 16, wherein each lead-acid battery of the plurality of lead-acid batteries comprise a vent configured to emit exhaust gases from the housing, wherein electrolyte inadvertently escapes through the vent, and wherein the vent comprises the hydrophobic texture, such that accumulation of electrolyte in the vent is resisted.

21. A method, comprising:
assembling components of a lead-acid battery in a housing of the lead-acid battery;
sealing the housing, wherein the housing comprises a hydrophobic texture forming a band around a first portion of an outer surface of the housing, wherein the band around the first portion of the outer surface of the housing covers a surface area of a side of the housing that is less than a total surface area of the side of the housing, and wherein a second portion of the outer surface of the housing is without the hydrophobic texture;
disposing electrolyte material into the housing to initiate an exothermic reaction in the housing;
disposing the lead-acid battery in a water bath configured to dissipate heat generated in the housing; and
resisting formation of a residue on at least the first portion of the outer surface of the housing with the hydrophobic texture.

22. The method of claim 21, comprising forming the hydrophobic texture in the housing using an injection mold before assembling the components of the lead-acid battery in the housing.

23. The method of claim 21, comprising forming the hydrophobic texture in the housing using a laser before or after sealing the housing.

24. The method of claim 21, wherein resisting formation of the residue on at least the first portion of the outer surface of the housing with the hydrophobic texture comprises causing formation of beads of water particles of the water bath on the housing.

25. The method of claim 24, comprising reducing adherence of the condensed electrolyte material in the water bath to at least the first portion of the outer surface of the housing with the hydrophobic texture relative to the second portion of the outer surface of the housing.

* * * * *